(12) United States Patent
Bouvet et al.

(10) Patent No.: US 8,540,489 B2
(45) Date of Patent: Sep. 24, 2013

(54) PELTON TURBINE WHEEL, METHOD FOR MAKING SAME AND PELTON TURBINE INCLUDING SUCH WHEEL

(75) Inventors: Yves Bouvet, La Terrasse (FR); Jean-Francois Bertea, Saint Jean de Muzols (FR)

(73) Assignee: Alstom Renewable Technologies, Grenoble (FR)

( * ) Notice: Subject to any disclaimer, the term of this patent is extended or adjusted under 35 U.S.C. 154(b) by 763 days.

(21) Appl. No.: 12/739,797

(22) PCT Filed: Oct. 29, 2008

(86) PCT No.: PCT/FR2008/051945
§ 371 (c)(1), (2), (4) Date: Apr. 26, 2010

(87) PCT Pub. No.: WO2009/056761
PCT Pub. Date: May 7, 2009

(65) Prior Publication Data
US 2010/0254814 A1    Oct. 7, 2010

(30) Foreign Application Priority Data
Oct. 30, 2007    (FR) ..................................... 07 58676

(51) Int. Cl.
*F03B 1/02*    (2006.01)
(52) U.S. Cl.
USPC .................. 416/197 B; 416/207; 416/220 R; 415/202

(58) Field of Classification Search
USPC .................. 416/197 B, 207, 220 R; 415/202
See application file for complete search history.

(56) References Cited

U.S. PATENT DOCUMENTS

| | | | | |
|---|---|---|---|---|
| 817,546 A | * | 4/1906 | Bush | 416/135 |
| 924,544 A | * | 6/1909 | Eckert | 416/197 R |
| 1,017,618 A | * | 2/1912 | Berry | 415/202 |

FOREIGN PATENT DOCUMENTS

| | | |
|---|---|---|
| AT | 380078 | 4/1986 |
| DE | 555900 | 8/1932 |
| EP | 0346681 | 12/1989 |
| EP | 0843092 | 5/1998 |

* cited by examiner

*Primary Examiner* — Ninh H Nguyen
(74) *Attorney, Agent, or Firm* — Dowell & Dowell, P.C.

(57) ABSTRACT

The invention relates to a Pelton turbine that comprises a plurality of sub-assemblies arranged about the rotation axis of the wheel and each including a bucket (111) and an anchoring leg (112). At least one blocking pin (13) is provided in a direction ($X_{13}$) parallel to the rotation axis ($X_1$) of the wheel between two adjacent anchoring legs (112, 112'), wherein said pin is inserted into two housings (1126, 1127) respectively formed in the two anchoring legs (112, 112'). According to the method of the invention, the blocking pin (13) is placed by inserting the same into the two housings (1126, 1127) of two adjacent anchoring legs (112, 112'). The pins are placed into the housings with a clearance, thereby allowing the relative sliding of the anchoring legs (112, 112') before blocking them with the pins (13).

14 Claims, 5 Drawing Sheets

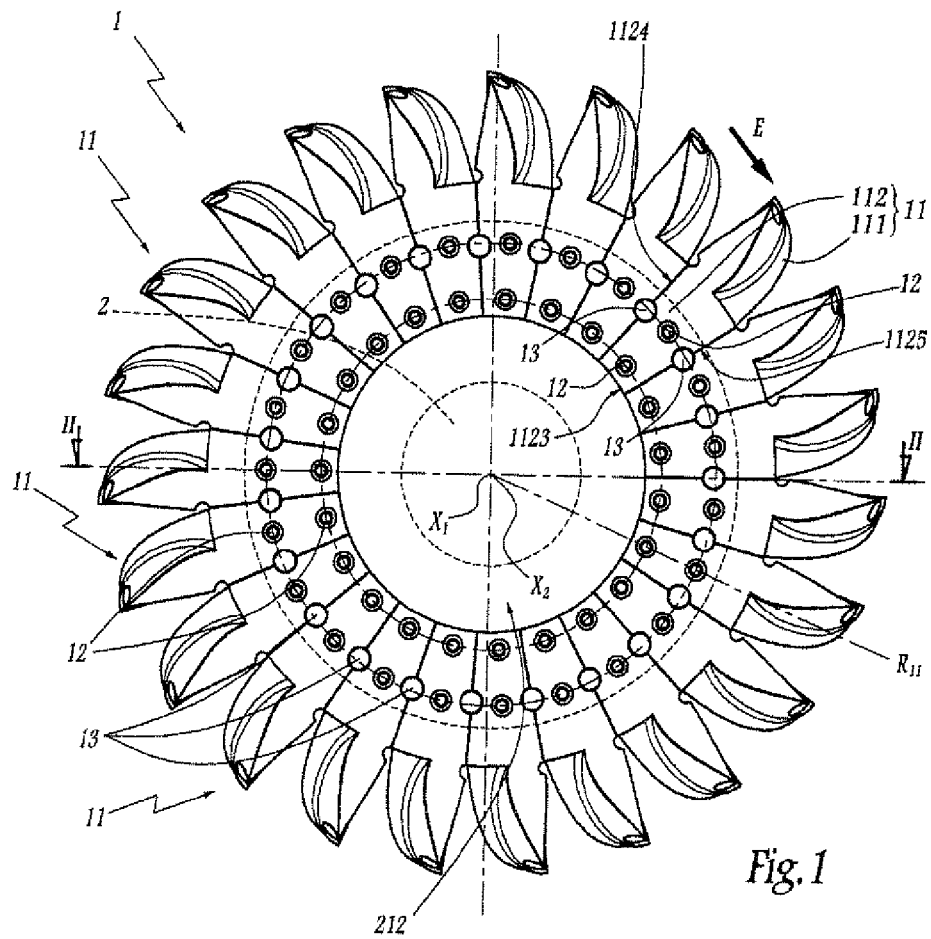
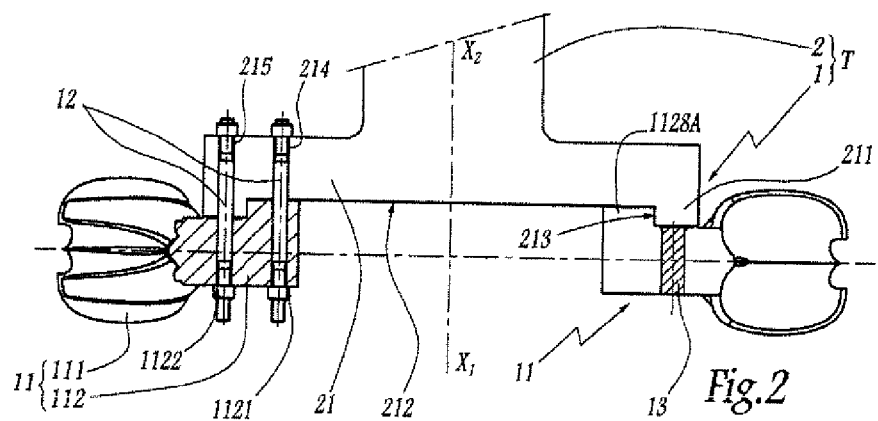

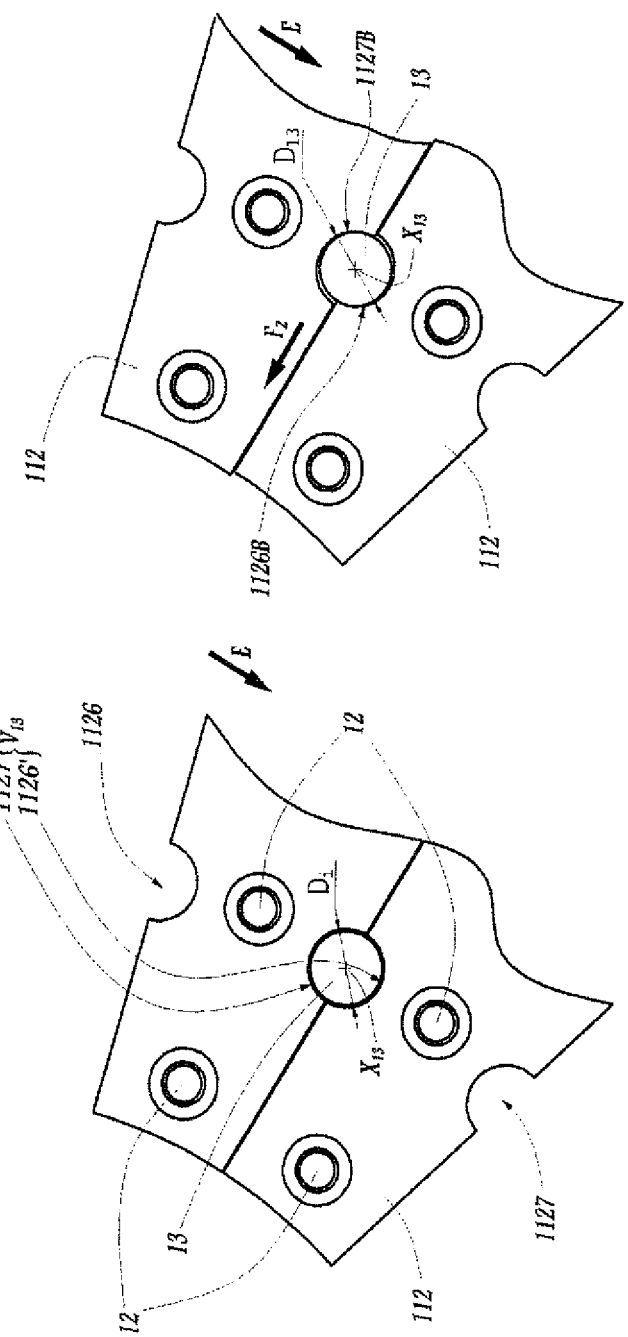

PELTON TURBINE WHEEL, METHOD FOR MAKING SAME AND PELTON TURBINE INCLUDING SUCH WHEEL

The invention relates to a wheel intended to be fitted to a turbine of the Pelton type used in an installation for converting hydraulic energy into mechanical or electric energy. The invention also relates to a turbine fitted with such a wheel and a method for manufacturing such a wheel.

In the case of a hydroelectric installation, a Pelton turbine is associated with a generator in order to produce electric current.

A one-piece Pelton turbine wheel is a bulky object which is awkward to machine and transport. It is known practice, for example from WO-A-99/49213, to manufacture a Pelton turbine wheel based on a rim onto which individual buckets are mounted, by means of bolts, while force-absorbing side plates are placed around the buckets. This type of equipment is satisfactory in many cases of use.

It is known practice, from DE-C-555900, to place conical retaining pins between two adjacent buckets the legs of which are clamped between two rims, by means of bolts. The use of conical retaining pins means that all of the buckets are locked together and relative to the rims because of the insertion of these conical retaining pins. The housings for receiving these retaining pins have to be bored with a conical shape in a very precise manner in order to allow a surface contact between these retaining pins and these bores, otherwise the conical retaining pins would not be effective. Such a machining precision involves high production costs.

The object of the invention is to propose an alternative solution in which independent buckets are used in a Pelton turbine wheel without it being necessary to make use of a force-absorbing outer side plate or to carry out precise machining of the anchoring legs of the buckets and where the assembly of the turbine wheel is long-lasting.

Accordingly, the invention relates to a Pelton turbine wheel which comprises several subassemblies distributed about an axis of rotation of the wheel and which each comprise a bucket and an anchoring leg. This wheel is characterized in that a cylindrical locking pin with a circular section is placed, in a direction parallel to the axis of rotation of the wheel, between each pair of two adjacent anchoring legs, this pin being engaged simultaneously in two housings arranged respectively in the aforementioned two anchoring legs and in that the pins are placed in the housings with the possibility of relative movement of the subassemblies under load and of movement of the pins engaged in the housings, until the pins lock the various anchoring legs relative to one another.

By virtue of the invention, the manufacture of the turbine wheel according to the invention is easy because the subassemblies can be manufactured independently of one another before being assembled to form the turbine wheel. These various subassemblies are relatively easy to machine, with relatively large manufacturing tolerances and their dimensions make it possible to manufacture them on conventional machining centers, and not on machining centers specific to large-dimension parts. Maintenance operations are also made easier because the subassemblies can be installed and removed individually relative to the turbine wheel. The locking pins placed at the interface between two adjacent anchoring legs make it possible to lock these legs relative to one another when the wheel is rotated under load, which limits the relative slip of the subassemblies relative to one another and relative to the turbine shaft and causes an effective wedging of the anchoring legs, after a relative sliding movement of the anchoring legs and the pins. The pins are placed in the housings with clearance, which allows the relative sliding of the anchoring legs so that they are wedged by the pins.

Moreover, the use of locking pins that are cylindrical with a circular section and installing them in the corresponding housings with the possibility of relative movement of the subassemblies under load make it easier to remove and interchange the buckets. Specifically, the clearances between the anchoring legs of the buckets can be relatively large and the machinings not very precise, which allows easy removal and replacement because the respective anchoring legs are in contact with one another not directly but via the locking pins.

According to advantageous but not mandatory aspects of the invention, a Pelton turbine wheel may incorporate one or more of the following features, taken in technically admissible combination:

- The sides of the two anchoring legs between which the locking pin is placed are not in contact.
- The internal diameter of a cylindrical volume with a circular section formed by a pair of housings arranged in two adjacent anchoring legs is strictly greater than the diameter of the portion of the pin engaged in this volume.
- Each anchoring leg is provided, on each of its two sides turned respectively toward the two adjacent anchoring legs, with a housing for partially receiving a locking pin.
- Each housing of an anchoring leg is in the shape of a cylinder, with a section corresponding to half of the section of the locking pin that it receives.
- Each anchoring leg is provided with at least one heel adapted to come into contact with an annular hoop which surrounds the anchoring legs, under the effect of the centrifugal force resulting from the rotation of the wheel.
- The subassemblies are mounted directly on the end of the shaft of the turbine, without the use of a force-absorbing flange.
- As a variant, the subassemblies are mounted on the end of the wheel of the turbine by means of at least one annular coupling flange. This flange may rest against a companion flange on which the anchoring legs are mounted. The flange or the companion flange advantageously forms a hoop capable of receiving the pressure of the heels of the anchoring legs, under the effect of centrifugal force. As a variant, at least one hoop is placed around the anchoring legs independently of the coupling flange.

The invention also relates to a Pelton turbine that is fitted with a wheel as specified above. Such a turbine can be manufactured more economically than those of the prior art and its maintenance is made easier.

The invention also relates to a method for manufacturing a Pelton turbine wheel as specified above and, more specifically, a method which comprises the steps consisting in:

a) mounting the subassemblies onto a circular structure b) placing, in a direction parallel to the axis of rotation of the wheel, a locking pin that is cylindrical and has a circular section in two housings arranged respectively in each pair of two adjacent anchoring legs and c) causing the wheel to undergo a rotation under load during which the subassemblies move relative to one another and move the pins engaged in their housings until the pins lock the various anchoring legs relative to one another.

Advantageously, during the rotation under load of the wheel, an anchoring leg tends to slide radially toward the axis of rotation, a portion of the surface defining a housing in this leg presses against the pin inserted in this housing and this pin presses against a portion of a surface delimiting a housing in an adjacent anchoring leg.

The invention will be better understood and other advantages of the latter will become more clearly apparent in the light of the following description of four embodiments of a turbine wheel and of a turbine according to its principle, given only as an example and made with reference to the appended drawings in which:

FIG. 1 is a front view of a turbine wheel according to the invention mounted on the shaft of a turbine also according to the invention;

FIG. 2 is a section along the line II-II in FIG. 1;

FIG. 4 is a schematic representation of two anchoring legs belonging to subassemblies such as that represented in FIG. 3, in a first configuration;

FIG. 5 is a view similar to FIG. 4 when the anchoring legs are in a second configuration;

Figure 3:
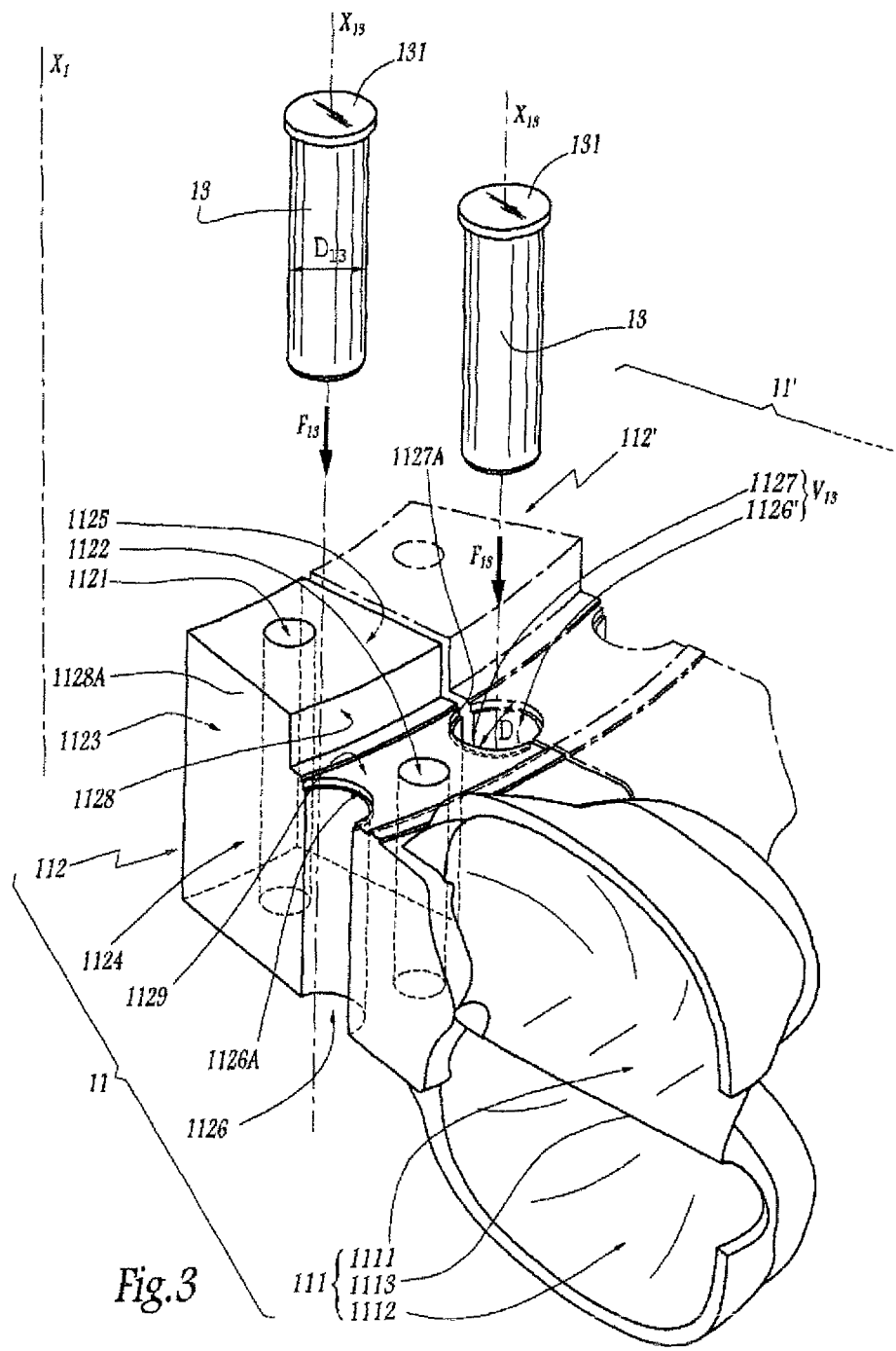
FIG. 3 is a view in perspective of a subassembly forming a bucket used in the wheel of FIGS. 1 and 2.

The wheel 1 shown in FIGS. 1 and 2 belongs to a turbine T of the Pelton type and is mounted on the end 21 of the shaft 2 of this turbine. The wheel 1 is formed by the assembly of independent subassemblies 11, one of which can be seen in perspective in FIG. 3, and which are formed in a one-piece part made of molded stainless steel.

As a variant, the subassemblies 11 may be made of forged stainless steel or of a composite material, which makes it possible to reduce their weight and the forces of inertia resulting from the rotation of the shaft.

Each subassembly 11 defines a bucket 111 delimiting two bowls 1111 and 1112 separated by a ridge 1113. The bucket 111 of a subassembly 11 is in one piece with an anchoring leg 112 which has by and large a shape of a totally reflecting prism the base of which has the shape that can be seen in FIG. 1. The anchoring leg 112 of a subassembly 11 is provided with two drill holes 1121 and 1122 for receiving retaining pins 12 for mounting the subassembly 11 on the end 21 of the shaft 2. For each subassembly 11, the two drill holes 1121 and 122 are aligned on a radius $R_{11}$ extending radially relative to the axis of rotation $X_2$ of the shaft 2, which is indistinguishable from the central axis $X_1$ of rotation of the wheel 1 in the mounted configuration of the latter.

The anchoring legs 112 are placed side by side on the end 21 of the shaft 2. The side of a leg 112 turned toward the axis $X_1$ in the mounted configuration of the wheel is marked 1123. The sides of a leg 112 turned toward the adjacent legs in the mounted configuration of the wheel 1 are marked respectively 1124 and 1125. The side 1124 is placed, relative to the drill holes 1121 and 1122, on the concave side of the bucket 111, while the side 1125 is situated, relative to these drill holes, on the convex side of this bucket.

A cylindrical housing 1126 with a semicircular section is arranged on the side 1124 and emerges on this side, while a cylindrical housing 1127 with a semicircular section is arranged on the side 1125 and emerges on this side. All the anchoring legs 112 are fitted with housings 1126 and 1127 on their respective sides 1124 and 1125 so that, when two anchoring legs are placed side by side, in the configuration shown in FIG. 1, a housing 1126 or 1127 of each leg 112 is placed facing a corresponding housing 1127 or 1126 of an adjacent leg. Pairs of housings 1126-1127 are thus formed which together constitute a cylindrical volume with a substantially circular section in which a locking pin 13 can be engaged that is cylindrical, is made in one piece and has a circular section.

The internal diameter $D_i$ of a cylindrical volume defined by a pair of housings 1126-1127 is slightly larger than the diameter $D_{13}$ of the portion of a pin 13 which enters this volume.

In FIG. 3, the outline of the anchoring leg 112' of a subassembly adjacent to that shown, in the mounted configuration of the wheel 1 appears in dashed lines. The housing 1126' of this second anchoring leg 112' defines, with the housing 1127, a volume $V_{13}$ for receiving a pin 13, which can be inserted into this volume in the direction of the arrow $F_{13}$ in this figure, that is to say in a direction parallel to the axes $X_1$ and $X_2$.

The anchoring legs 112 and the end 21 have dimensions such that, when the wheel 1 is mounted on the shaft 2, the opposite faces 1124 and 1125 of the various legs 112 are not in contact.

The anchoring leg 112 of a subassembly 11 comprises a surface 1128 that is opposite to the surface 1123 and that delimits a heel 1128A protruding from the surface 1129 into which the drill hole 1122 emerges, in the vicinity of the surface 1128. The end 21 of the shaft 2 is, for its part, provided with a terminal collar 211 which delimits, with the front face 212 of the end 21, a shoulder 213 for receiving the heel 1128A in the mounted configuration of a subassembly 11 on the shaft 2.

Each pin 13 is fitted, at one of its ends, with a head 131 which is engaged in a recess 1126A or 1127A which borders each housing 1126 or 1127 in the vicinity of the surface 1129. The pins can enter the housings 1126 and 1127 via the side of the surface 1129, while engaging their end opposite to their head 131 in these housings, in the direction of the arrows $F_{13}$ in FIG. 3.

As a variant, the pins 13 can be inserted into the volumes $V_{13}$ via the side of the legs 112 opposite to the surface 1129. In this case, the recesses 1126A and 1127A are removed from the vicinity of the surface 1129.

The wheel 1 is assembled to the shaft 2 by positioning each anchoring leg 112 on the end 21 of the shaft 2 so that its drill holes 1121 and 1122 come to face the corresponding drill holes 214 and 215 arranged in the end 21 and allowing the retaining pins 12 to pass through. The pins 13 are inserted between the legs 112 gradually as the subassemblies 11 are installed on the shaft 2, while being installed with their respective axes $X_{13}$ parallel to the axes $X_1$ and $X_2$ then being indistinguishable. The retaining pins 12 are then tensioned, respectively in the drill holes 1121 and 214 on the one hand, 1122 and 215 on the other hand, for each subassembly 11.

As a variant, the subassemblies 11 are prepositioned on a base template, then the pins 13 are inserted into the volumes $V_{13}$ through the surface 1129 and the wheel thus formed is mounted onto the flange plate of the shaft 2. Then, the retaining pins 12 are tensioned.

In this configuration, the faces 1124 and 1125 of the various legs 112 are not in contact with one another and the various housings 1126 and 1127 define, in pairs, volumes $V_{13}$ for receiving the locking pins 13. Note in FIG. 2 that the pins 13 do not enter the end 21 of the shaft 2.

When they are thus put in place in the housings 1126 and 1127, the pins 13 ensure the stability of the wheel 1 thus formed.

At the time of the first rotation of the wheel 1 under load, that is to say when it is subjected to a flow represented by the arrow E in FIGS. 1, 4 and 5, the subassemblies 11 are pressed against an internal shoulder 213 of the end 21 of the shaft 2, under the effect of the centrifugal force. These subassemblies tend to pivot relative to the shaft 2, which causes each anchoring leg to be forcefully pressed against a pin 13 engaged in its housing 1127 and this phenomenon is repeated for all the subassemblies 11 of the wheel 1. The various subassemblies move the pins 13 slightly relative to the shaft 2 under the effect of their pivoting, which is possible since the pins 13 are not secured to the shaft 2. The force sustained by each bucket 111 because of the jet causes a relative sliding of the subassemblies 11 relative to the shaft 2 and wedges these subassemblies relative to one another by virtue of the action of the pins 13. Therefore, the pins 13 ensure a long-lasting mounting of the various subassemblies 11 onto the shaft 2 while locking the various anchoring legs 112 against one another.

FIGS. 4 and 5, in which the heads 131 have been omitted for clarity of the drawing, schematize this phenomenon and represent two anchoring legs 112 and a pin 13 respectively before and after the wheel 1 is started for the first time. Before the first start, the pin 13 is mounted in the volume $V_{13}$ defined jointly by the housings 1126 and 1127 of the legs 112. When the force E due to the flow E is applied to the subassemblies 11, the legs 112 slide relative to one another as shown by the arrow $F_2$ in FIG. 5. The leg 112 shown in the upper portion of this figure tends to slide radially inward relative to the leg 112 shown in the lower portion, which has the effect of bringing a portion 1126B of the surface defining the housing 1126 to press against the pin 13 and to bring the pin 13 to press against a portion 1127B of the surface delimiting the housing 1127 of the leg 112 shown in the upper portion. The portions 1126B and 1127B of the surfaces of the housings 1126 and 1127 therefore form zones of contact between the pin 13 and the anchoring legs 112, the zone 1126B being radially closer to the axis $X_1$ than the central axis $X_{13}$ of the pin 13, which is closer to the axis $X_1$ of the zone 1127B.

In other words, the pins 13 are mounted in the housings 126 and 127 with clearance, because of the difference between the diameters $D_i$ and $D_{13}$ and the first rotation of the wheel 1 under load has the effect of taking up this clearance, because of the relative sliding $F_2$ of the anchoring legs 112 against one another.

During the phases of stopping and starting of the turbine 1, the relative position of the various anchoring legs, which has been obtained after sliding during the first start, is maintained because of the forces of friction between the assembled parts 112 and 13. In order to increase the friction between the parts 112 and 13 put in place following their relative sliding, it is possible to use powders increasing the coefficient of friction between their respective contact surfaces. This ensures that the friction between the surfaces is capable of preventing sliding between the anchoring legs 112 and the pins 13 during the starting and stopping phases or during a normal operation after a first rotation of the wheel.

In the event of runaway of the turbine T, a considerable centrifugal force is exerted on the subassemblies 11, which tend to slide together radially toward the outside of the shaft 2. After a runaway followed by a normal restart of the turbine T, the subassemblies 11 resume their balanced position.

Moreover, the radial expansion movement of the wheel 1, under the effect of the centrifugal force due to its rotation, is limited by the fact that the heels 1128A of the anchoring legs 112 are placed at the shoulder 213 of the end 21. Therefore, the radial expansion of the wheel 1 is limited by the pressure of the surface 1128 of each anchoring leg 112 against the collar 211 which forms a radial stop for the legs 111 of the subassemblies 11.

The first embodiment of the invention described with reference to FIGS. 1 to 5 applies more particularly to the manufacture of a new turbine the shaft 2 of which can be configured, by forming the collar 211 and the drill holes 214 and 215, to receive directly the subassemblies 11 without the use of a force-absorbing flange as explained above.

The invention can also be used with a turbine T the shaft 2 of which has a flat end, as shown in FIGS. 6 to 9. This is particularly useful during the refurbishment of an existing turbine the shaft of which does not have to be changed.

In the three embodiments shown in FIGS. 6 to 9, the elements similar to those of the first embodiment bear identical references. In these three embodiments, the pins 13 are mounted with clearance in the cylindrical volumes formed by the housings like the housings 1126 and 1127 of the first embodiment, which also makes it possible to have a locking of the anchoring legs 112 against one another following a relative sliding movement of these anchoring legs during a rotation of the wheel under load, as explained above for the first embodiment.

Figure 6:
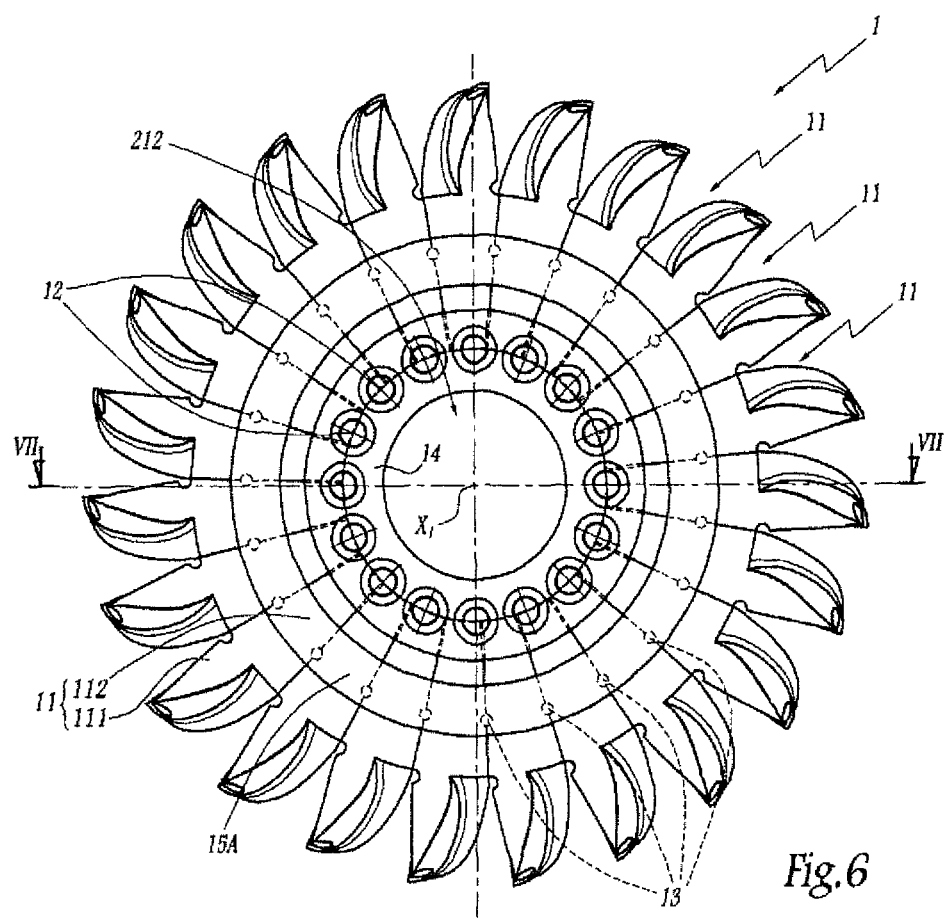
FIG. 6 is a view similar to FIG. 1 for a turbine wheel according to a second embodiment.
Figure 7:
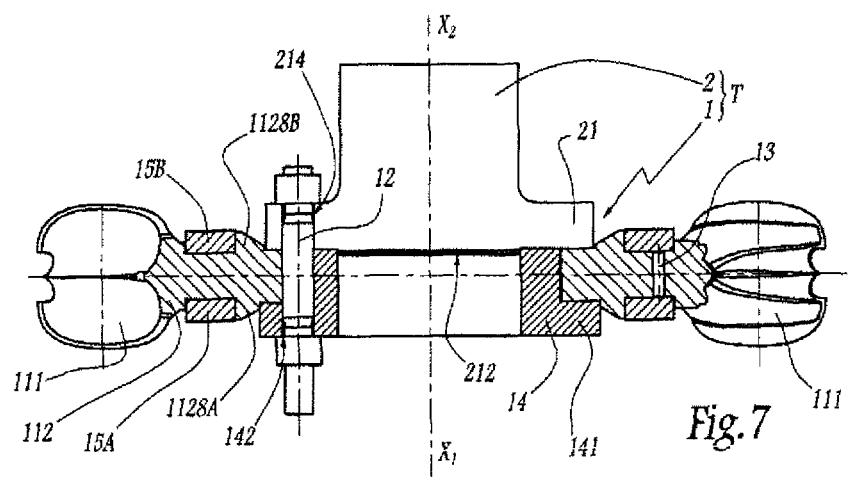
FIG. 7 is a section along the line VII-VII in FIG. 6.

In the second embodiment of the invention shown in FIGS. 6 and 7, the wheel 1 of the Pelton turbine T is formed by subassemblies 11 which comprise, as in the first embodiment, buckets 111 and anchoring legs 112. The end 21 of the shaft 2 has a flat front face 212. The wheel 1 is secured to the shaft 2 by virtue of the coupling retaining pins 12 which pass through a flange 14 provided with a collar 141 for the axial pressure of the internal radial portion of the anchoring legs 112 against the front face 212. The retaining pins 12 pass through drill holes 214 arranged in the end 21, these drill holes being able to preexist in the case of refurbishment of the turbine T. The distribution of the drill holes 142 for the retaining pins 12 to pass through in the flange 14 is then made to suit that of the drill holes 214.

Two hoops 15A and 15B are placed on either side of the anchoring legs 112 and make it possible to withstand the radial expansion of the wheel 1 under the effect of the centrifugal force when the turbine T rotates, particularly in the case of a runaway. Heels 1128A and 1128B are arranged in the legs 112 in order to butt respectively against the hoops 15A and 15B under the effect of the centrifugal force. As above, the locking pins 13 are inserted into the housings, like the housings 1126 and 1127 of the first embodiment, at the interface between two adjacent anchoring legs 112.

Figure 8:
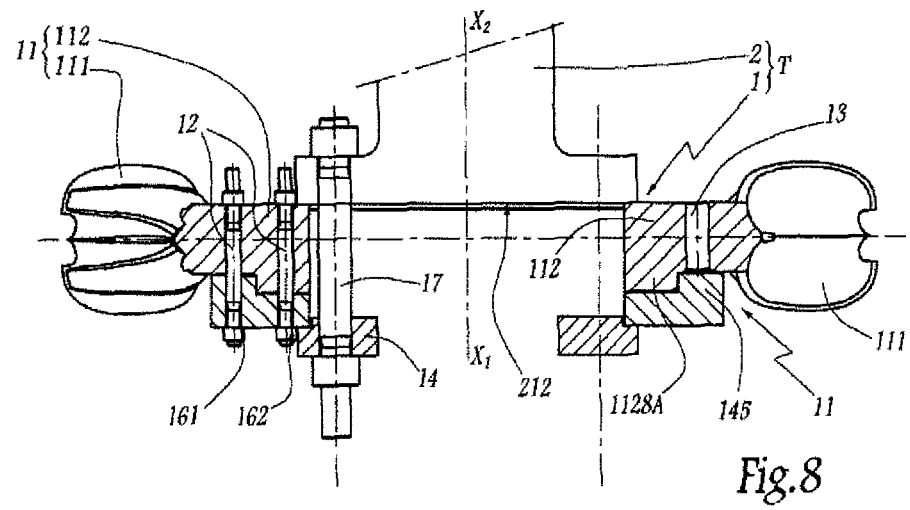
FIG. 8 is a section similar to FIG. 7 for a turbine wheel according to a third embodiment of the invention.

In the third embodiment shown in FIG. 8, a flange 14 is also used to press the anchoring legs 112 of the subassemblies 11 of a wheel 1 against the flat front face 212 of the shaft 2 of a Pelton turbine T. As before, the locking pins 13 are used to limit the relative sliding of the anchoring legs 112. A companion flange 16 receives the pressure of the flange 14 and is provided with drill holes 161 and 162 for locking retaining pins 12 similar to those of the first embodiment to pass through. The companion flange 16 forms a collar 163 which operates as a hoop for a heel 1128A of the anchoring leg 112 of each subassembly 11.

In this embodiment, the main retaining pins 17 are used to axially press the flange 14 and the legs 112 toward the shaft 2, as in the second embodiment.

Figure 9:
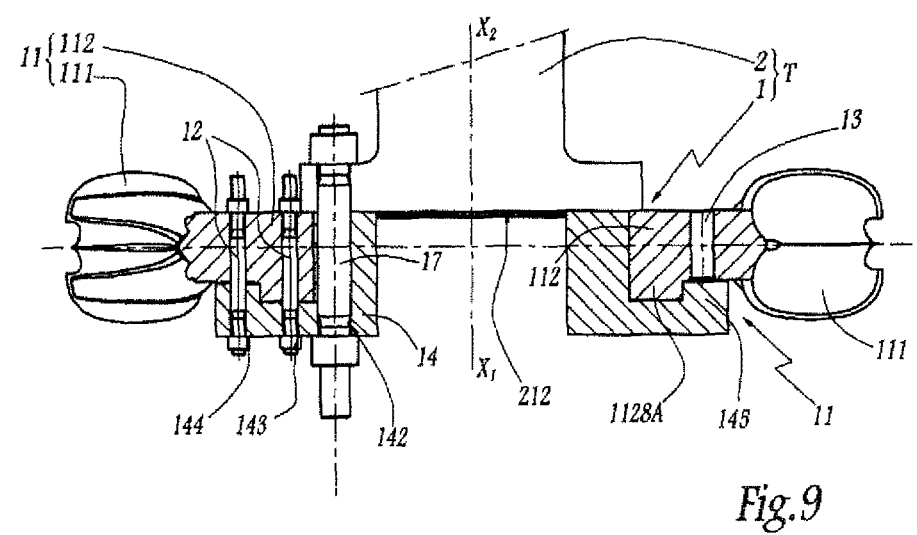
FIG. 9 is a section similar to FIG. 7 for a turbine wheel according to a fourth embodiment of the invention.

In the fourth embodiment shown in FIG. 9, the flanges 14 and 16 of the second embodiment are replaced by a one-piece flange 14 which defines drill holes 142 for the main retaining pins 17 to pass through and drill holes 143 and 144 for the retaining pins 12 for fastening the anchoring pins 112 to this flange to pass through. As above, the wheel 1 comprises subassemblies 11 each comprising a bucket 111 and a leg 112 and locking pins 13, which make it possible to limit the relative slide between the anchoring legs 112. The flange 14 forms a hoop 145 against which a heel 1128A of each leg 112 presses.

The technical features of the various embodiments described can be combined in the context of the present invention.

Irrespective of the embodiment, the number of subassemblies 11, of retaining pins 12 and of locking pins 13 results from a design choice by those skilled in the art.

The pins 13 do not necessarily have a circular section. In this case, the geometry of the housings 1126 and 1127 is adapted to that of the pins.

According to a variant that can be applied to all the embodiments of the invention, a coating increasing the coefficient of friction between the parts 11 and 2, and if necessary between these parts and the parts 14 and 145, can be used at the interface between these parts, in order to ensure positional retention by friction of the subassemblies 11 in operation.

Irrespective of the embodiment in question, an advantage of a Pelton turbine wheel according to the invention lies in the fact that the buckets that form it are "self-locking" under the effect of the centrifugal force and of the load sustained by the buckets during a first rotation. Moreover, the relatively large clearances between the anchoring legs of the buckets mean that the latter are in contact only via the locking pins and not by direct pressure against one another, which makes the operations of removal and changing of one or more buckets easier if necessary. The relative placement of the anchoring legs of the buckets by relative sliding during the first rotation is totally advantageous relative to the devices of the prior art in which such a sliding phenomenon cannot be used.

The invention claimed is:

1. A Pelton turbine wheel comprising several subassemblies distributed about an axis of rotation of the wheel and each comprising a bucket and an anchoring leg, characterized in that a cylindrical locking pin with a circular section is placed, in a direction parallel to the axis of rotation of the wheel, between each pair of two adjacent anchoring legs, this pin being engaged simultaneously in two housings arranged respectively in the two anchoring legs and in that the pins are placed in the housings with the possibility of relative movement of the subassemblies under load and of movement of the pins engaged in the housings, until the pins lock the various anchoring legs relative to one another.

2. The Pelton turbine wheel as claimed in claim 1, characterized in that the sides of the two anchoring legs between which the locking pin is placed are not in contact.

3. The Pelton turbine wheel as claimed in claim 1, characterized in that the internal diameter of a cylindrical volume with a circular section formed by a pair of housings arranged in two adjacent anchoring legs is strictly greater than the diameter of the portion of the pin engaged in this volume.

4. The Pelton turbine wheel as claimed in claim 1, characterized in that each anchoring leg is provided, on each of its two sides turned respectively toward the two adjacent anchoring legs, with a housing for partially receiving a locking pin.

5. The Pelton turbine wheel as claimed in claim 1, characterized in that each housing of an anchoring leg is in the shape of a cylinder, with a section corresponding to half of the section of the locking pin that it receives.

6. The Pelton turbine wheel as claimed in claim 1, characterized in that each anchoring leg is provided with at least one heel adapted to come into contact with an annular hoop which surrounds the anchoring legs, under the effect of the centrifugal force resulting from the rotation of the wheel.

7. The Pelton turbine wheel as claimed in claim 1, characterized in that the subassemblies are mounted directly on the end of the shaft of the turbine, without the use of a force-absorbing flange.

8. The Pelton turbine wheel as claimed in claim 1, characterized in that the subassemblies are mounted on the end of the shaft of the turbine by means of at least one annular coupling flange.

9. The Pelton turbine wheel as claimed in claim 8, characterized in that the flange is resting against a companion flange on which the anchoring legs are mounted.

10. The Pelton turbine wheel as claimed in claim 8, characterized in that each anchoring leg is provided with at least one heel adapted to come into contact with an annular hoop which surrounds the anchoring legs, under the effect of the centrifugal force resulting from the rotation of the wheel and in that each anchoring leg is provided with at least one heel adapted to come into contact with an annular hoop which surrounds the anchoring legs, under the effect of the centrifugal force resulting from the rotation of the wheel and the flange or the companion flange forms a hoop capable of receiving the pressure of the heels of the anchoring legs, under the effect of centrifugal force.

11. The Pelton turbine wheel as claimed in claim 8, characterized in that at least one hoop is placed around the anchoring legs independently of the coupling flange.

12. A Pelton turbine comprising a wheel as claimed in claim 1.

13. A method for mounting a Pelton turbine wheel comprising several subassemblies distributed about an axis of rotation of the wheel and each comprising a bucket and an anchoring leg, characterized in that it comprises steps consisting in:
   a) mounting the subassemblies onto a circular structure and
   b) placing, in a direction parallel to the axis of rotation of the wheel, a locking pin that is cylindrical and has a circular section in two housings arranged respectively in each pair of two adjacent anchoring legs and
   c) causing the wheel to undergo a rotation under load during which the subassemblies move relative to one another and move the pins engaged in their housings until the pins lock the various anchoring legs relative to one another.

14. The method as claimed in claim 13, characterized in that, during the rotation under load of the wheel, an anchoring leg tends to slide radially toward the axis of rotation, a portion of the surface defining a housing in this leg presses against the pin inserted in this housing and this pin presses against a portion of a surface delimiting a housing in an adjacent anchoring leg.

* * * * *